Sept. 29, 1942.  G. WÜNSCH  2,297,274
GYROSCOPE
Filed May 27, 1939
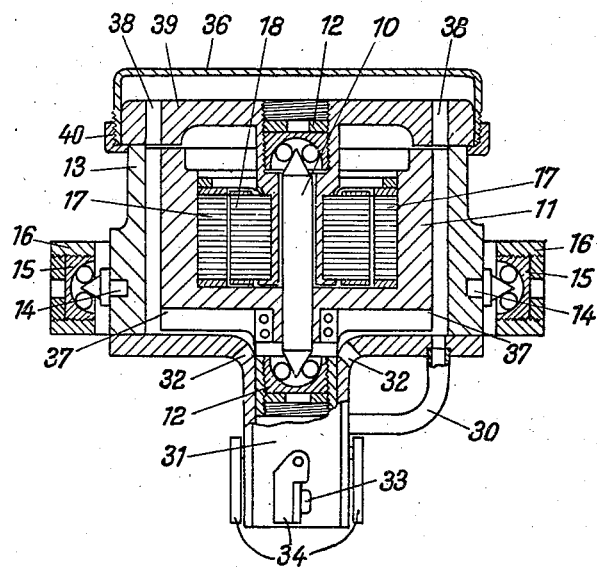
Inventor:
Guido Wünsch
By A. D. Adams
Attorney Patented Sept. 29, 1942

2,297,274

UNITED STATES PATENT OFFICE 2,297,274

GYROSCOPE

Guido Wünsch, Berlin-Wannsee, Germany; vested in the Alien Property Custodian

Application May 27, 1939, Serial No. 276,243
In Germany May 27, 1938

2 Claims. (Cl. 74—5)

This invention relates to instruments having a universally mounted gyroscope and more particularly to gyroscopic direction indicators for aircraft. In order to render such gyroscopic instruments insensitive to acceleration forces the gyro rotor is suspended with neutral equilibrium. For this reason, before being set in operation the gyroscope has an arbitrary position and therefore must be brought into its normal position before the instrument is ready for use.

Air jets, which are controlled for example by pendulum shutters provided on the gyro rotor case, are conveniently used for erecting the gyro rotor and maintaining it in the desired position. The erecting of the gyroscope takes a rather long time, this disadvantage being particularly apparent in the case of electrically operated gyroscopes, if the air jets are produced by the rotation of the gyro rotor, as is generally the case.

Whereas in pneumatically driven gyroscopes the regulating air jets already reach their full effect while the gyro rotor is starting up, so that owing to the still little spin the gyroscope is erected comparatively quickly, the air for precessing the gyro rotor which is produced in an electrically driven gyroscope by the turbine effect of the rotor, becomes effective at a relatively high speed of the gyroscope only. As a result, the gyroscope starts up in the position it occupies fortuitously, and is gradually brought into its normal position which, on account of the high spin, occurs fairly slowly.

In order to adjust the gyro rotor before it is started up the known directional and horizon gyroscopes are provided with manually operable setting or caging devices. Apart from the fact that the operation of these devices is burdensome to the pilot, the setting of the instrument remains dependent on the position of the aircraft, which as is known, generally differs considerably before the start from the normal flying position.

The object of the invention is to provide means whereby the gyroscope is held in its correct position before the instrument is put into use, without its responding directly to accelerating forces during operation as is the case for example in the previously used gyroscopic pendulums which execute spiral precessional oscillations owing to their pendulosity. According to the invention a pendulosity maintaining the gyro rotor in its normal position as long as the instrument is not in use is eliminated by the automatic rising of a mass when the gyroscope is set in operation, so that during operation the gyroscope is in neutral equilibrium. In this way the gyroscope is prevented from taking an arbitrary position when it has stopped, whilst on the other hand the advantages of suspending it in neutral equilibrium are retained during operation.

The mass serving to eliminate the pendulosity is shiftably arranged on the gyro rotor carrier, as a hood closing the top of the rotor case which is lifted by the air pressure produced in the case when the gyroscope is set in operation.

The invention will now be described with reference to the accompanying drawing, which is a vertical section through an electrically driven gyro-vertical.

This arrangement is principally also adapted to maintain in its proper position a gyro rotor having a normally horizontal axis of rotation.

The vertical axis of rotation or spindle 10 of the gyro rotor 11 is mounted in ball bearings 12 in the gyro rotor case 13. The latter is mounted to pivot on horizontal pins 14 in bearings 15 in the Cardan ring 16, which in turn is carried by a shaft (not shown) lying perpendicular to the plane of the paper.

Within the flywheel mass of the rotor 11 there is disposed a short-circuit armature 17 of known construction which is set in rotation by a rotating field produced in the stator 18. Turbine blades 37 to which air passes through orifices 32 in the rotor case 13 serve to produce the erecting air jets. The compressed air passes by way of a pipe 30 to the pendulum-controlled erecting device 31.

The setting device possesses four orifices 33 displaced by 90° relative to one another, which are screened alternately by pendulum shutters 34. When the axis of rotation of the gyroscope differs from the vertical, the reactive forces of the air jets issuing from the orifices 33 cause precessional moments, which return said axis back into its proper position on a straight line.

The automatic displacement of the centre of gravity when the gyroscope is set in operation is effected by the shifting of a hood 36 fitting on the periphery of the cover 39 of the rotor case and thus closing the top of the case. The air generated by the rotor blades 37 passes through orifices 38 in the case cover 39 under the hood 36. When the gyro rotor is stationary the hood 36 rests on the case cover 39, but on account of the large effective area it is raised at a comparatively low speed of the gyroscope to such an extent that the screw ring 40 fitted on the hood 36 abuts against the projecting cover 39 as illustrated. The state of neutral equilibrium can be adjusted very exactly by turning the screw ring 40.

If the neutral equilibrium were to exist in the state of rest also, the gyro rotor would take up an arbitrary position before being set in operation and the erection of the rotor spin axis 10 would proceed very slowly, because the air jets produced by the rotation of the rotor 11 have a very weak effect at low speeds of revolution. As the speed of revolution increases the spin of the gyroscope becomes more effective, in consequence whereof the instrument may not be ready for use until a long time after the gyro rotor has achieved its working speed. Owing to the pendulums 20 hanging down when the rotor 11 is stationary, the axis of rotation 10 is prevented from obtaining an oblique position when the gyroscope comes to rest, and thus the instrument will start straight away in the proper position.

Obviously, the present invention is not restricted to the particular embodiment herein shown and described. Moreover, it is not indispensable that all the features of this invention be used conjointly, since they may be employed advantageously in various combinations and sub-combinations.

What is claimed is:

1. A universally mounted gyroscope comprising a case, a spindle rotatably mounted within said case, a rotor attached to said spindle, a support for pivoting said case about a first axis at right angles to said spindle, said support being itself pivoted about a second axis at right angles to said spindle and said first axis, a flanged hood resting loosely on said case, abutment means on the flange of said hood adapted to engage a projecting part of said case, and means for delivering to the underside of said flanged hood compressed air produced by the rotation of said rotor.

2. A universally mounted gyroscope comprising a case, a spindle rotatably mounted within said case, a rotor attached to said spindle, a support for pivoting said case about a first axis at right angles to said spindle, said support being itself pivoted about a second axis at right angles to said spindle and said first axis, a flanged hood resting loosely on said case, a screw-threaded flanged ring screwed onto the flange of said hood and adapted to engage with a projecting part of said case, and means for delivering to the underside of said flanged hood compressed air produced by the rotation of said rotor.

GUIDO WÜNSCH.